Jan. 23, 1968          J. B. VAN BURLEIGH ETAL          3,365,352
PLASTIC NET HAVING BIAXIAL ORIENTATION OF MOLECULES
Filed April 1, 1963                                          2 Sheets-Sheet 1
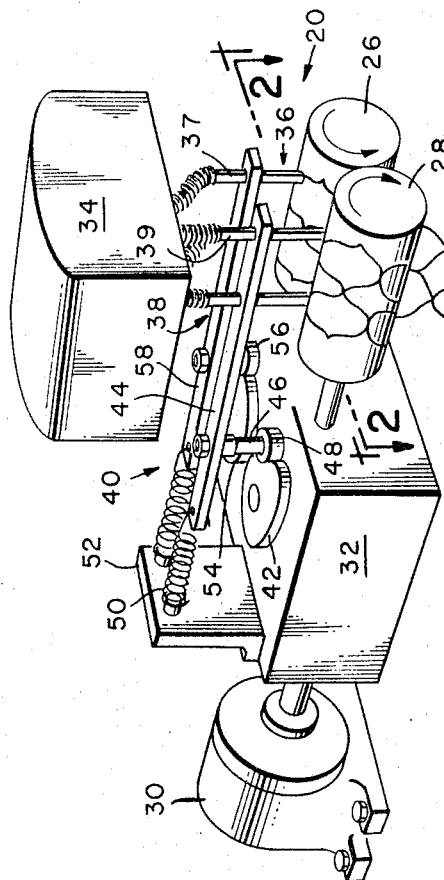
FIG. 1.
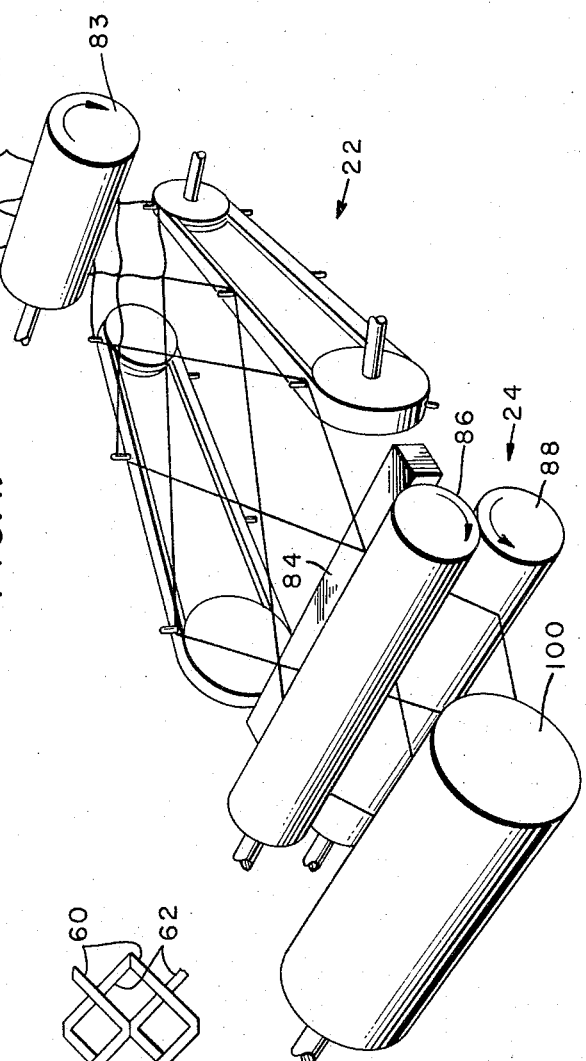
FIG. 2.
FIG. 3.
INVENTORS.
JOHANNES BALFOUR VAN BURLEIGH
CORNELIA BREAS
BY
*Kelly O. Corley*
ATTORNEY United States Patent Office 3,365,352
Patented Jan. 23, 1968

3,365,352
PLASTIC NET HAVING BIAXIAL ORIENTATION OF MOLECULES
Johannes Balfour van Burleigh and Cornelia Breas, both of 10 Park Paaschberg, Ede, Netherlands
Filed Apr. 1, 1963, Ser. No. 269,616
3 Claims. (Cl. 161—109)

The present invention relates to the production of net-like non-woven fabric made from thermoplastic polymers of the type in which the individual threads or filaments intersect primarily in diagonal directions, and wherein the threads are bonded to each other at the intersections by heat sealing.

Similar net-like plastic cloths are known to the prior art. In one type, the cloth is produced in a tubular shape by a rotating spinneret arrangement, and is formed by a number of spiral synthetic filaments extending to the left along the axis of the tube, and an equal number of spiral filaments extending to the right along the axis of the tube. The spun tubular netting may be cut and open flat, whereby a flat cloth of diamond-like mesh is obtained. Such cloth is described, for example, in British Patent 836,555. Plastic cloths have likewise been made by heat sealing together plastic monofilaments at their intersection points. Each of the above described fabrics suffer from the disadvantage that the junctions between filaments are not properly oriented, even though the fabric be drawn or stretched. Accordingly, the strength capabilities of the fabric are not achieved due to the weakness at the filament intersections.

A primary object of the present invention is to provide non-woven plastic cloth which provides substantial strength in the region where filaments intersect each other.

A further object is to provide fabric orienting apparatus and a method for producing oriented cloth.

A further object is to provide a novel and flexible fabric spinning apparatus and method.

Further objects will in part be obvious, and will be disclosed hereinafter.

The invention accordingly comprises the several steps, and the relation of one or more of said steps with respect to each of the others, and the apparatus embodying the features of construction, combinations of elements and arrangements of parts which are adapted to effect such steps, together with the article possessing the features or properties which are exemplified in the following detailed disclosure, and the scope of the invention will be indicated in the claims.

For a more complete understanding of the nature and objects of the invention, reference should be made to the following detailed description taken in connection with the accompanying drawings, in which:

FIGURE 1 is a schematic perspective view of an exemplary form of apparatus according to the present invention;

FIGURE 2 is a sectional view taken along line 2—2 in FIGURE 1, showing one fabric pattern being spun;

FIGURE 3 is a plan view of a fabric produced by the apparatus of FIGURE 2 after tentering;

Figure 4:
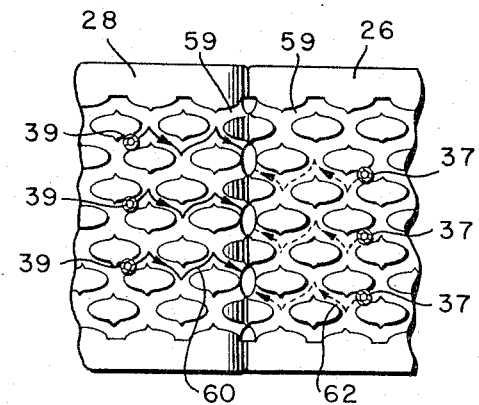
FIGURE 4 is a fragmentary developed plan view similar to FIGURE 2, and shows a different fabric pattern being spun on the upper inner quadrants of the spinning rolls.

Referring now to FIGURE 1, there is schematically illustrated an exemplary fabric manufacturing apparatus according to the present invention. As shown therein, the apparatus generally comprises a fabric spinning assembly 20, a tenter frame 22 where the spun fabric is laterally spread, and an orienting assembly 24 for imparting strength to the tentered fabric.

Referring now more specifically to FIGURE 1, a pair of parallel abutting fabric spinning rolls 26 and 28 are driven by a motor 30 through a gear box 32. A polymer supply tank 34 is positioned above spinning rolls 26 and 28, and supplies molten polymer under pressure to two parallel banks 36 and 38 of flexible tubes having spinnerets 37 and 39, respectively, at their lower ends. Bank 36 extends generally parallel to the axis of roll 26, with its spinnerets 37 positioned above the upper quadrant of roll 26 nearest roll 28, while bank 38 and its spinnerets 39 are similarly positioned and aligned above the upper quadrant of roll 28 nearest roll 26. In the apparatus as thus constituted, molten polymer is supplied from supply tank 34 downwardly through the several flexible spinning tubes to be extruded therefrom onto the surfaces of rolls 26 and 28.

According to one aspect of the present invention, the banks 36 and 38 are reciprocally driven back and forth parallel to the axes of their respective spinning rolls by suitable drive means 40, in synchronism to the rotary movement of rolls 26 and 28. Thus, a cam 42 is driven by gear box 32 at a rate of speed synchronized to the rotation of spinning roll 28. The spinning tubes in bank 38 are secured together by a horizontally extending guide bar 44. A downwardly extending rod 46 is secured at its upper end to guide bar 44, and bears a roller 48 on its lower end, for cooperation with the surface of cam 42. A coil spring 50 attaches the leftmost end of guide bar 44 (as viewed in FIGURE 1) to an upwardly extending bracket 52, which is secured to gear box 32. Thus guide bar 44 is continually resiliently urged to the left as viewed in FIGURE 1 by spring 50, and is cyclically moved to the right by the cooperation of roller 48 with cam 42, the motion of guide bar 44 being thus synchronized to the rotation of spinning roll 26, as will be explained in detail below. A similar arrangement, including cam 54 and roll 56, provides for synchronous control of guide bar 58 and thus for movement of bank 36, and accordingly will not be described in detail.

Referring now to FIGURE 2, it will be seen that spinning rolls 26 and 28 have their outer circumferential surfaces provided with a pattern of generally circumferential periodically intersecting grooves 59 which receive the spun polymer. As viewed in FIGURE 2, the spinneret tubes in bank 36 are positioned directly above corresponding grooves on roll 26, while the spinnerets of bank 38 are positioned directly above corresponding grooves on roll 28. Since cams 42 and 54 and rolls 26 and 28 are each driven in synchronism from gear box 32, the axial movement of groups 36 and 38 are controlled by their respective cams 54 and 42 so that each spinneret tube is always directly above a groove on the corresponding spinning roll.

Referring now to FIGURES 1, 2 and 3, as rolls 26 and 28 rotate together, the polymer filaments 60 laid in the grooves of spinning roll 26 and filaments 62 laid in the grooves of roll 28 are complementary and are brought together periodically due to the groove configurations. The filaments are then fused to one another to provide the net-like fabric 63 illustrated in FIGURE 1. The temperature of rolls 26 and 28 is controlled so that the polymer solidifies as it leaves the spinning rolls. A suitable roll temperature for nylon-6 is from about 190 to 210 degrees centigrade (° C.). The solidified fabric 63 after being tentered has the appearance illustrated in FIGURE 3. While the illustrated rolls shown in FIGURES 1 and 2 can accommodate only two spinning tubes or spinnerets per roll, it is within the contemplation of the present invention to provide a larger grooved pattern with more axially spaced grooves and as many cooperating spinning tubes as is desired.

Referring more specifically to FIGURE 3, it will be noted that there are two types of intersections between the individual filaments: an abutting junction as illustrated at 64 and a simple cross junction as illustrated at 66. Each of these types of junctions provides substantial physical strength upon being properly oriented.

Figure 5:
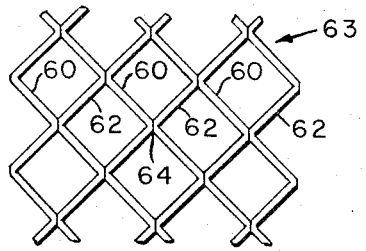
FIGURE 5 is a plan view of the fabric produced by the FIGURE 4 rolls after tentering.

FIGURE 4 schematically shows a second spinning pattern wherein the paths of polymer filaments 60 extruded from spinnerets 39 are shown as solid lines and the paths of polymer filaments 62 extruded from spinnerets 37 are shown as dotted lines. When the fabric spun by the FIGURE 4 pattern has been tentered, it has the appearance depicted in FIGURE 5 wherein each of the junctions 64 is in the form of an abutting joint.

Figure 6:
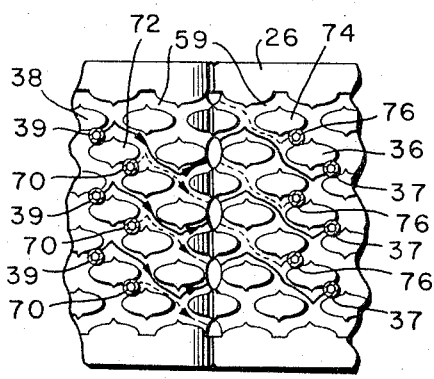
FIGURE 6 is a fragmentary developed plan view similar to FIGURE 4 showing a third fabric pattern being spun on the upper inner quadrants of a pair of spinning rolls.
Figure 7:
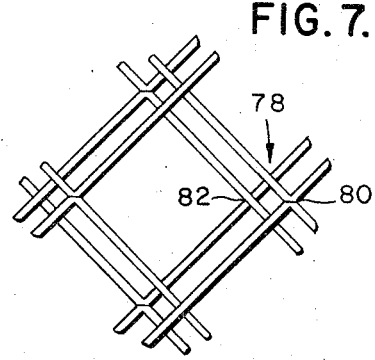
FIGURE 7 is a plan view of the "doubled" fabric produced by the FIGURE 6 spinning rolls after tentering.

A third spinning pattern is illustrated in FIGURE 6, which produces the net-like fabric of doubled filaments shown schematically in FIGURE 7. In addition to the spinnerets 39 in bank 38, a further group of tubes having spinnerets 70 is arranged in a bank 72 positioned above the upper inner quadrant of spinning roll 28 somewhat nearer roll 26 than spinnerets 39. The central positions of spinnerets 70 are axially halfway between spinnerets 39. Bank 72 is driven from gear box 32 by a suitable cam arrangement through the same sequence of deflections as is bank 38. However, the timing of the axial movements of bank 72 is such that the extreme axial deflections of polymer from spinnerets 70 deposited on roll 28 fall midway on the roll between extreme deflections of polymer from spinnerets 39. In like manner, a fourth bank 74 of tubes having spinnerets 76 is positioned above the upper inner quadrant of spinning roll 26 somewhat nearer roll 28 than spinnerets 37. The central positions of spinnerets 76 are axially halfway between spinnerets 37. Bank 74 is driven from gear box 32 by a similar cam arrangement through the same sequence of deflections as is bank 36. Similarly, the timing of the axial movements of bank 74 is such that the extreme axial deflections of polymer from spinnerets 76 deposited on roll 26 fall midway on the roll between extreme deflections of polymer from spinnerets 37. Thus it will be seen that the spinneret arrangements are symmetrical over the two spinning rolls. As may be seen from an inspection of FIGURE 6, the pattern of filaments extruded on the surface of roll 26 is complementary to the pattern extruded onto roll 28, to produce the fabric illustrated in FIGURE 7.

As shown in FIGURE 7, wherein the spacing of the filaments is exaggerated to more clearly illustrate the structure, each composite junction 78 consists of an abutting junction 80 and a cross junction illustrated at 82. Thus all junctions in the interior of the fabric are uniform. In the actual spun fabric, the adjacent filaments would be bonded together substantially uniformly along their abutting edges, or would actually be completely fused together to form a single filament.

By way of example each groove 59 may have a width of 0.2 millimeter (mm.) in the direction parallel to the axis of the spinning roll, and the grooves may be separated from each other a nominal axial distance of 0.2 mm. Each spinneret tube may then be deflected through a total movement of 0.64 mm. parallel to the axis of the spinning rolls to produce the spinning pattern illustrated in FIGURES 2 and 6, or through a total distance of 0.24 mm. to produce the pattern illustrated in FIGURE 4.

Referring again to FIGURE 1, the spun fabric 63 is passed under a guide roll 83 and onto a conventional tenter frame 22, which laterally spreads or stretches the fabric in preparation for the orienting assembly 24. For reasons which will be explained, the fabric is preferably laterally stretched sufficiently so that the individual filaments form angles of between 30 and 60 degrees with the longitudinal axis of the fabric. The orienting assembly 24 then biaxially orients or stretches the filaments and the junctions of the filaments under the proper temperature conditions.

Assembly 24 includes a fabric heater 84 for pre-heating the fabric to the proper temperature, and a pair of hot nip-forming orienting rolls 86 and 88, which deform the filaments to a flat, tape-like configuration. The manner in which it is thought that the orientation takes place will be explained with reference to FIGURES 8 and 9.

Figure 8:
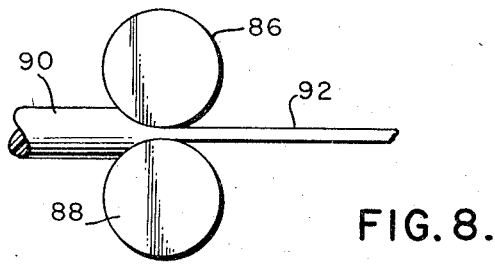
FIGURE 8 is a schematic side elevation view of the orienting rolls shown in FIGURE 1.
Figure 9:
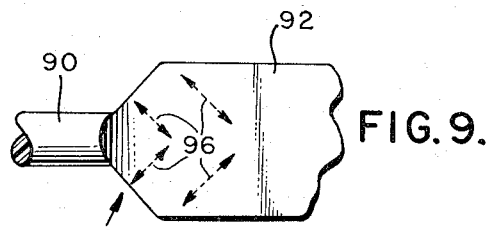
FIGURE 9 is a plan view of the filament shown in FIGURE 8.

Referring to FIGURE 8, a round filament 90 passed between rolls 86 and 88 at right angles to the roll axes becomes flattened to a tape-like configuration 92, best shown in FIGURE 9. In the transition region 94, the material flows in directions and amounts determined by the ratio of the diameter of filament 90 to the diameters of rolls 86 and 88, the spacing of the rolls, the longitudinal speed of the filament, and the temperature of the filament. By properly relating these factors, flow may be induced primarily in the directions indicated by the arrows 96, i.e., at 45 degrees from the axis of travel through the rolls and at 90 degrees from each other. For nylon-6, the filaments may be preheated to approximately 180° C., and the orienting rolls 86 and 88 may be maintained at this temperature. With a nylon-6 filament of 3 mm. diameter, 60 mm. diameter rolls 86 and 88 spaced 0.28 mm. apart are suitable. The unoriented filament may enter the rolls with a speed of 2 feet per second (f./s.) while the oriented filament may leave the rolls at a speed of 9.4 f./s. The oriented filament leaving the orienting rolls 86 and 88 in this example has a thickness of 0.3 by 5.0 mm. width, and a cross-sectional area of 1.5 mm.$^2$. This gives a reduction in cross-sectional area of 4.7 to 1. Preferably the finished width should be at least 15 times the finished thickness of the filament in order to achieve optimum physical properties. This produces a tape-like filament having orientation in the directions of the arrows 96. If the filament is passed through the rolls at a 45 degree angle to the filament axis, orientation will still be produced in two directions at 45 degrees to the roll axes, but now one of the orientation components will be parallel to the filament axis and the other will be perpendicular to the filament axis.

Figure 10:
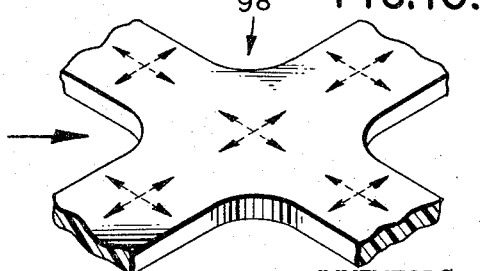
FIGURE 10 is a top plan view of an oriented fabric intersection, showing the directions of orientation therein.

This effect is utilized to produce uniform orientation of fabric 63 by rolls 86 and 88. As noted above, each filament in fabric 63 is aligned at about 45 degrees to the axis of fabric movement by tenter frame 22, and thus passes through rolls 86 and 88 at a 45 degree angle. The resulting orientation is illustrated in FIGURE 10, wherein a single junction 98 is shown. The direction in which the junction has passed through the orientation rolls is shown by the solid arrow, and the resulting directions of orientation are shown by the dotted arrows, which show substantially uniform orientation in two directions throughout the fabric. It is particularly noted that this orientation is parallel to each of the filaments, and produces substantially uniform strength throughout the fabric.

After passing through orienting rolls 86 and 88, the oriented fabric is taken up on a take-up roll 100, which rotates at a higher peripheral velocity than the orienting rolls. This maintains tension on the fabric while it is cooling and prevents curling. If desired, a further set of nip rolls may be provided prior to the take-up roll to impart an after-stretch to the fabric along its longitudinal axis, it being understood that this further set of nip rolls would rotate at a higher peripheral velocity than rolls 86 and 88.

In the above description and the accompanying drawings, there has been disclosed a novel net-like non-woven fabric which may readily be made from thermoplastic polymers by a simple process and apparatus. The orienting process, using a pair of nip rolls to control the flow of material, provides excellent orientation of the fibers or filaments, particularly in the regions where filaments are bonded or integrally joined together, and provides a fabric having substantial and uniform strength throughout. The fabric thus produced has a wide field of utility, including, but not limited to, packaging and other similar end uses wherein uniform strength and economical costs are essential.

It will thus be seen that the objects set forth above, among those made apparent from the preceding description, are efficiently attained and, since certain changes may be made in carrying out the above process, in the described product, and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A net-like fabric comprising:
   (a) a plurality of thermoplastic filaments integrally joined together at intersections of substantially the same thickness as the individual filaments,
   (b) the molecules in said filaments being biaxially oriented at said intersections substantially parallel to each of the intersecting filaments.

2. A net-like fabric of thermoplastic filaments bonded together comprising:
   (a) first and second intersecting filaments integrally joined together at a junction substantially the same thickness as said filaments,
   (b) the molecules in each filament near said junction being oriented substantially parallel to the axis of the filament and oriented substantially parallel to the axis of the other filament.

3. A net-like fabric of thermoplastic filaments bonded together comprising:
   (a) first and second intersecting filaments integrally joined together at a junction substantially the same thickness as said filaments,
   (b) the molecules in each filament near said junction being oriented substantially parallel to the axis of the filament and orientation at substantially right angles thereto.

References Cited

UNITED STATES PATENTS

| | | | |
|---|---|---|---|
| 2,281,635 | 5/1942 | Strauss | 161—89 |
| 3,092,439 | 6/1963 | Harrison | 264—154 |
| 3,242,023 | 3/1966 | Schultheiss | 156—167 |
| 3,140,330 | 7/1964 | Gutierrez | 264—288 |
| 3,222,440 | 12/1965 | Murphy | 264—167 |

FOREIGN PATENTS 773,718   5/1957   Great Britain.

OTHER REFERENCES

Nielsen, Mechanical Properties of Polymers, Reinhold Pub. Corp., N.Y., 1962, copy in Group 160 TP 156 P6N5 (pp. 235–236 relied on).

ROBERT F. BURNETT, *Primary Examiner.*

ALEXANDER WYMAN, *Examiner.*

G. D. MORRIS, *Assistant Examiner.*